(12) United States Patent
Madan et al.

(10) Patent No.: US 11,881,031 B2
(45) Date of Patent: Jan. 23, 2024

(54) HIERARCHICAL PROCESSING OF TRAFFIC SIGNAL FACE STATES

(71) Applicant: FORD GLOBAL TECHNOLOGIES, LLC, Dearborn, MI (US)

(72) Inventors: Siddharth Madan, San Jose, CA (US); Richard L. Kwant, San Bruno, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 17/466,658

(22) Filed: Sep. 3, 2021

(65) Prior Publication Data
US 2023/0073038 A1  Mar. 9, 2023

(51) Int. Cl.
| | | |
|---|---|---|
| *G06V 20/58* | (2022.01) | |
| *G06V 10/56* | (2022.01) | |
| *G06F 18/2433* | (2023.01) | |
| *G06F 18/2431* | (2023.01) | |
| *B60Q 9/00* | (2006.01) | |
| *G08G 1/0962* | (2006.01) | |
| *H04N 23/90* | (2023.01) | |

(52) U.S. Cl.
CPC .............. *G06V 20/584* (2022.01); *B60Q 9/00* (2013.01); *G06F 18/2431* (2023.01); *G06F 18/2433* (2023.01); *G06V 10/56* (2022.01); *G08G 1/0962* (2013.01); *H04N 23/90* (2023.01)

(58) Field of Classification Search
CPC ........ G06V 20/584; G06V 10/56; B60Q 9/00; G06F 18/2431; G06F 18/2433; G08G 1/0962; H04N 23/90
See application file for complete search history.

(56) References Cited

U.S. PATENT DOCUMENTS

| | | |
|---|---|---|
| 9,779,314 B1 | 10/2017 | Wendel et al. |
| 2019/0332875 A1 | 10/2019 | Vallespi-Gonzalez et al. |
| 2021/0048830 A1* | 2/2021 | Creusot .............. G08G 1/09623 |
| 2021/0211568 A1* | 7/2021 | Zhou .................... H04N 23/743 |
| 2022/0076036 A1* | 3/2022 | Taieb .................. B60W 60/001 |

FOREIGN PATENT DOCUMENTS

WO    2020243484 A1    12/2020

OTHER PUBLICATIONS

Li, Z. et al., An improved traffic lights recognition algorithm for autonomous driving in complex scenarios, International Journal of Distributed Sensor Networks, vol. 17(5), 2021.

* cited by examiner

*Primary Examiner* — Zhitong Chen
(74) *Attorney, Agent, or Firm* — Frank MacKenzie; Brooks Kushman P.C.

(57) ABSTRACT

This document describes methods to assign a collective state to a group of traffic signal devices that are concurrently detected by multiple cameras. The states may be color states or other states. The system will process the images to identify states of each of the devices in the images. When the devices exhibit more than one state, the system will determine an overall state for the group by generating a confidence score for each of the states. The system will select, from the multiple states, the state having a confidence score that exceeds a threshold. The system will then use the selected state to assign an overall state to the group of traffic signal devices. The system may use the overall state to generate a signal that will cause the vehicle to perform an action such as a motion control action, or output of an audible or visual alert.

20 Claims, 6 Drawing Sheets

HIERARCHICAL PROCESSING OF TRAFFIC SIGNAL FACE STATES

BACKGROUND

The present disclosure relates to traffic signal state identification and, in particular, to methods and systems by which an autonomous vehicle or other system may process images of traffic signal devices to identify the states of individual lights or other signal elements on the face of the traffic signal devices.

Traffic signals help facilitate the flow of traffic in busy areas. They include traffic signal elements that signal when it is the legal and appropriate time for vehicles to pass or enter certain intersections or other regions. For this reason, when operating a vehicle, both human operators and autonomous vehicle technology platforms must accurately and efficiently identify traffic signals and the states of the traffic signal element. Once determined, this information can then be used to determine a motion, or lack thereof, of the vehicle.

Autonomous vehicles typically include multiple cameras and other sensors that capture information about the environment through which the vehicle is traveling. Cameras and other sensors will surround the vehicle, and when the vehicle approaches a traffic signal device it is typical that multiple sensors will detect the device. If different sensors of a vehicle each detect a traffic signal but provide different information about the state of a particular traffic signal, the vehicle's operating system could select the most conservative state. For example, the system could assume that the traffic signal is red if even only one sensor yields red state information for the signal. However, this would cause the vehicle to stop even if the signal is not actually in the red state, which is not always a desirable result. In addition, at many traffic signal locations, there is not always a single traffic signal. Oftentimes, intersections or other traffic signal locations have multiple traffic signals, each of which may have multiple traffic signal faces controlling traffic in a particular direction. The presence of multiple traffic signals in a single image increases the computational effort required for an automated system to analyze and determine the overall state of the traffic signals at an intersection at any given point in time.

For at least these reasons, an efficient means of processing images captured by multiple sensors to determine the states of traffic signal faces in those images is needed.

SUMMARY

This document describes methods by which a vehicle or other system may detect a group of traffic signal devices and assign a collective state to the group of traffic signal devices. The states may be color states (such as red, yellow, or green); flashing or non-flashing states; or states that exhibit symbols such as an "X", a hand or a pedestrian. Multiple cameras of the system will capture images that each depict the group of traffic signal devices. The system will access and process the images to determine states of each of the traffic signal devices that are in the images. When the traffic signal devices exhibit more than one state, the system will resolve the inconsistency and determine an overall state for the group by generating a confidence score for each of the states. The system will select, from the multiple states, the state having a confidence score that exceeds a threshold. The system will then use the selected state to assign an overall state to the group of traffic signal devices. The system will then use the overall state to generate a signal that will cause the vehicle to perform an action such as (a) implementing a motion control action, (b) causing an audio speaker of the vehicle to output an audible alert that indicates the overall state, or (c) causing a display device of the vehicle to output a visual alert that indicates the overall state.

In some embodiments, when the system receives the images that were concurrently captured by the cameras, the system will assign, to at least one traffic signal element on each of the traffic signal devices in each of plurality of images, a label indicating a color state of the traffic signal element. Then, for each of the traffic signal devices, if any of the labels for any of the traffic signal elements indicates a red state, the system will assign the red state to the traffic signal device; otherwise the system will assign a non-red color state to the traffic signal device. Alternatively, the label may indicate a flashing state or a non-flashing state; if so, then for each of the traffic signal devices, if any of the labels for any of the traffic signal elements indicates a flashing state, the system will assign the flashing state to the traffic signal device; otherwise the system will assign a non-flashing state to the traffic signal device.

In some embodiments, to generate the confidence score for each of the states the system may, for each of the states, calculate a number of the traffic signal devices in the group that share that state. The confidence store may then be that number, which may be an integer, a percentage, a ratio or another metric.

In some embodiments, the system may identify the threshold by selecting, from a memory, a confidence threshold that is associated with the class of the traffic signal device.

Optionally, to use the selected state to assign an overall state to the group of traffic signal devices, the system may implement various rules. For example, when the traffic signal devices in the group correspond to a single class of devices, the system may assign the selected state to be the overall state. When the traffic signal devices in the group corresponding to multiple classes of devices, the system may identify one of the multiple classes to be a priority class, and it will determine the overall state for the group of devices to be the selected state of the priority class. Alternatively, when the traffic signal devices in the group correspond to multiple classes of devices, the system may assign a multi-class state in which each of the classes is assigned a unique state.

DETAILED DESCRIPTION

Figure 1:
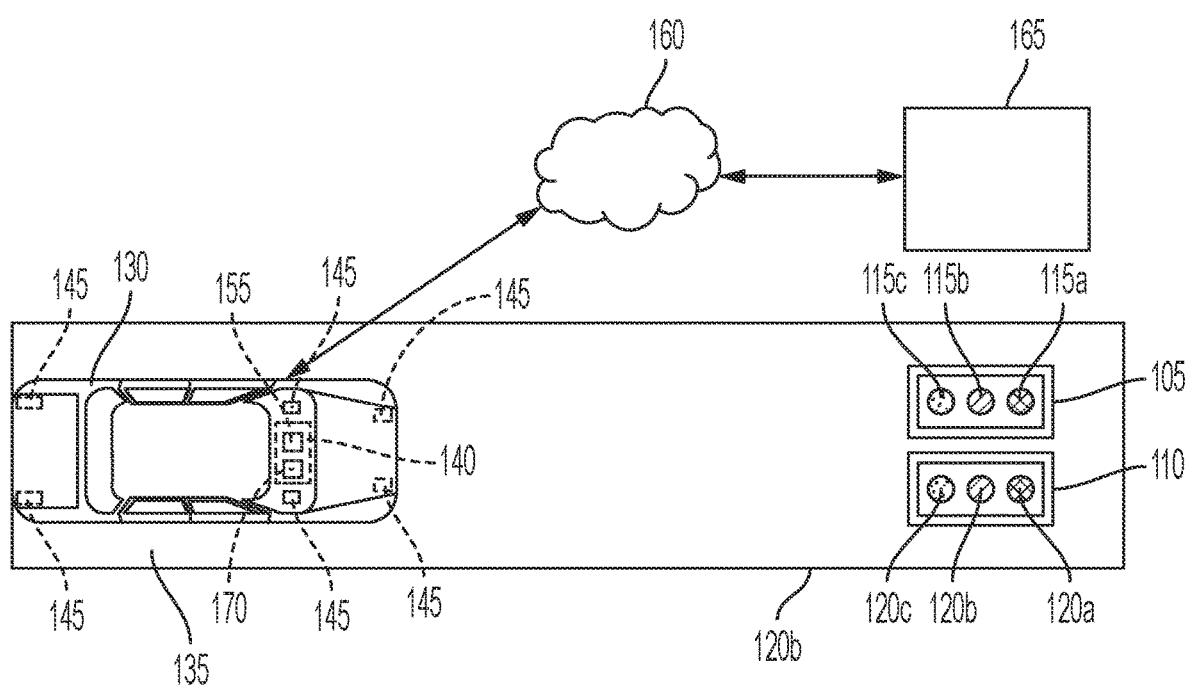
FIG. 1 is an example of a system for sensing one or more traffic signal devices and determining an overall state of each of the one or more traffic signal devices, in accordance with various embodiments of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "traffic signal" or "traffic signal device" refers to one or more devices that are positioned along a roadway or at an intersection of two or more roadways, and that are configured to communicate a set of visual cues that direct movement of vehicles passing through the intersection or roadways. The cues may direct the vehicles as to when to proceed, when to slow, when to wait, when to stop, when to make a turn, or the like. The visual cues are typically output via electronically controlled lights, each of which may be referred to in this document as a "traffic signal element". The visual cue that each traffic signal element displays is referred to as a "state" of the element, and the overall visual cue that collectively output by all signal elements of a traffic signal device is the "traffic signal state". A traffic signal state may include a color state (such as red, yellow or green), as well as an illuminated, non-illuminated and/or blinking state.

Many AVs use sensors such as cameras to visualize traffic signals and traffic signal elements. AVs often then analyze the visualizations (e.g., pictures) of the traffic signals and perform on-car post-processing logic. Using this logic, in prior systems a traffic signal state is typically determined to be red if a single sensor detects the color red on a single illuminated traffic signal face, irrespective of the amount of information that may be present for a non-red state.

Referring now to FIG. 1, a system for sensing one or more traffic signals 105, 110 and determining the overall state of each traffic signals 105, 110 is illustratively depicted, in accordance with various embodiments of the present disclosure.

Traffic signal devices 105, 110 output visual cues via one or more traffic signal elements 115a-c, 120a-c located on the faces of the traffic signal devices 105, 110. The traffic signal elements 115a-c, 120a-c are dynamic in that they can be changed between at least two states to transmit information that a vehicle operator can use to guide vehicle operations. In addition, different types of signal elements may be present in a single traffic signal device. Examples of traffic signal elements may include, for example, a red light 115a, 120a, a yellow light 115b, 120b, and a green light 115c, 120c. In addition, some traffic signal elements may include directional arrows (such as arrows pointing left or right), other symbols (such as a symbol of a person walking), or one or more words or letters (such as an X).

In each of these examples, each traffic signal element 115a-c, 120a-c can be switched between and off state and an on state. Thus, at any given point in time, each traffic signal device 105, 110 will exhibit a state that corresponds to which signal elements of the device are on at that point in time. Example traffic signal device states include a green state, a yellow state, a red state, a left arrow state, a right arrow state, or a forward arrow state. In addition, any of these states may be further modified to be classified as a flashing state of the particular color or icon.

According to various embodiments, the system includes a vehicle 130 such as an AV. The vehicle 130 is traveling on a road 135 along which the traffic signal devices 105, 110 are positioned. It is noted, however, that any suitable path for the vehicle 130 may be implemented.

The vehicle 130 may include a perception system, which may include one or more image capturing devices, such as cameras 145, for capturing images of the one or more traffic signal devices 105, 110. The cameras 145 may be positioned at various positions of the vehicle 130 such as, for example, the front, rear, and/or sides of the vehicle 130 and/or any other suitable position. In some embodiments, the cameras 145 may include one or more pairs of stereo cameras. According to various embodiments, the cameras 145 may be positioned at various locations encircling the vehicle 130, positioned such that a subset of the cameras 145 can view any or all of the traffic signal devices 110, 115 at any one time from different viewing angles. The perception system of the vehicle 130 also may include one or more computing devices 140 with a processor 170 that is in communication with the cameras 145, as well as a memory 155 storing programming instructions that are configured to cause the processor 170 to receive digital images from the cameras 145 and process the images to identify the traffic signal devices 105, 110 and their corresponding states.

The vehicle 130 may include a geographic location system configured to determine a location and orientation of the vehicle 130. The geographic location system may include a global positioning system (GPS) device. It is noted, however, that other forms of geographic location may additionally, or alternatively, be used, such as high definition maps and programming that is configured to correlate information from images captured by the cameras 145 to data in the maps.

The vehicle 130 may further include a transceiver configured to send and receive digital information to and from a remote server 165 via a wired and/or wireless connection such as, for example, through a wireless communication network 160, wherein the vehicle 130 and the remote server 165 are in electronic communication with each other. It is noted that the processor 170 may be a standalone processor, the vehicle's processor, and/or the remote server's processor 170. Data processed by the processor 170 may be data received from sensors and/or other systems of the vehicle 130, received from the remote server 165, and/or a combination of data received from the vehicle 130 and the remote server 165.

As the vehicle moves about an environment, the various cameras 145 will capture one or more images, some of which will include images of one or more of the traffic signal devices 105, 110. For example, referring to FIG. 2, as the vehicle 130 moves along a road 135, one of its cameras may capture an image 200 that includes traffic signal devices 105, 110, 115 when the traffic signal devices 105, 110, 115 are in the view of one or more of the vehicle's cameras. This image 200 also includes other actors 205, 210, which in this image are other vehicles but which may be pedestrians, cyclists, animals, or other types of actors.

When the vehicle's perception system captures an image such as image 200, the vehicle's perception system will execute programming instructions that are configured to cause the system to analyze the image in order to identify traffic signal devices 105, 110, 115 and determine the state of each traffic signal device 105, 110, 115 in that image. This aspect of the perception system may be considered to be a traffic signal element state determination module. The traffic signal element state determination module that can identify traffic signal devices in the image, determine the color of each active (i.e., on-state) traffic signal element of each device, and optionally other characteristics of the signal elements such as the shape of the element (e.g., circle, arrow, or lettering), and/or whether the traffic signal element is in a solid on light or a flashing on state. Any suitable image processing and object classification process may be used in this process. For example, according to various embodiments, the traffic signal element state determination module may include a Hidden Markov Model ("HMM")-based CPU state tracker, a recurrent neural network ("RNN")-based tracker, and/or other suitable form of traffic signal element state determination module. In some embodiments, to identify that a traffic signal is in a field of view of the camera and thus likely to be in the image, the vehicle may use a GPS sensor to determine the vehicle's location, analyze map data to identify features of the location that are ahead of the vehicle in the field of view, and determine (from the map data) that one of the identified features must therefore be a traffic signal device. Alternatively, a transceiver of the vehicle may receive data indicating that a traffic signal device is present in a communication from a roadside unit as a signal phase and timing (SPaT) message.

When the map or other data indicates that a traffic signal device should be present, the system will conclude that a traffic signal device must be present in the camera field of view, and the system will analyze an image at that location to find the traffic signal device. The system may then apply any suitable object classification model to identify the traffic signal device and its state. Suitable processes are disclosed in, for example: (a) U.S. patent application Ser. No. 17/001,999, filed Aug. 25, 2020, the disclosure of which is incorporated into this patent document by reference; (b) U.S. patent application Ser. No. 16/817,708, filed Mar. 13, 2020, the disclosure of which is incorporated into this patent document by reference; and (c) Li et al, "An Improved Traffic Lights Recognition Algorithm for Autonomous Driving in Complex Scenarios" (Int'l Journal of Distributed Sensor Networks 2021).

Because AVs contain multiple cameras, the AV's perception system will assign a traffic signal state to the traffic signal devices in each image captured by each camera. In some circumstances due to variations in lighting, occlusions that interfere with part of a camera's field of view or other factors, a traffic signal device state that the AV assigns from one camera's image may not correlate with the assigned state for one or more other images of the device captured by other cameras of the vehicle. In addition, when multiple traffic signal devices are detected at a location, the system may need to resolve conflicts between the states assigned to the multiple traffic signal devices. In order to alleviate such discrepancies, the system incorporates a hierarchical approach to determining an overall state of a set of traffic signal devices that are positioned at a location. This process will now be described with reference to FIGS. 3A-3B.

Figure 3A:
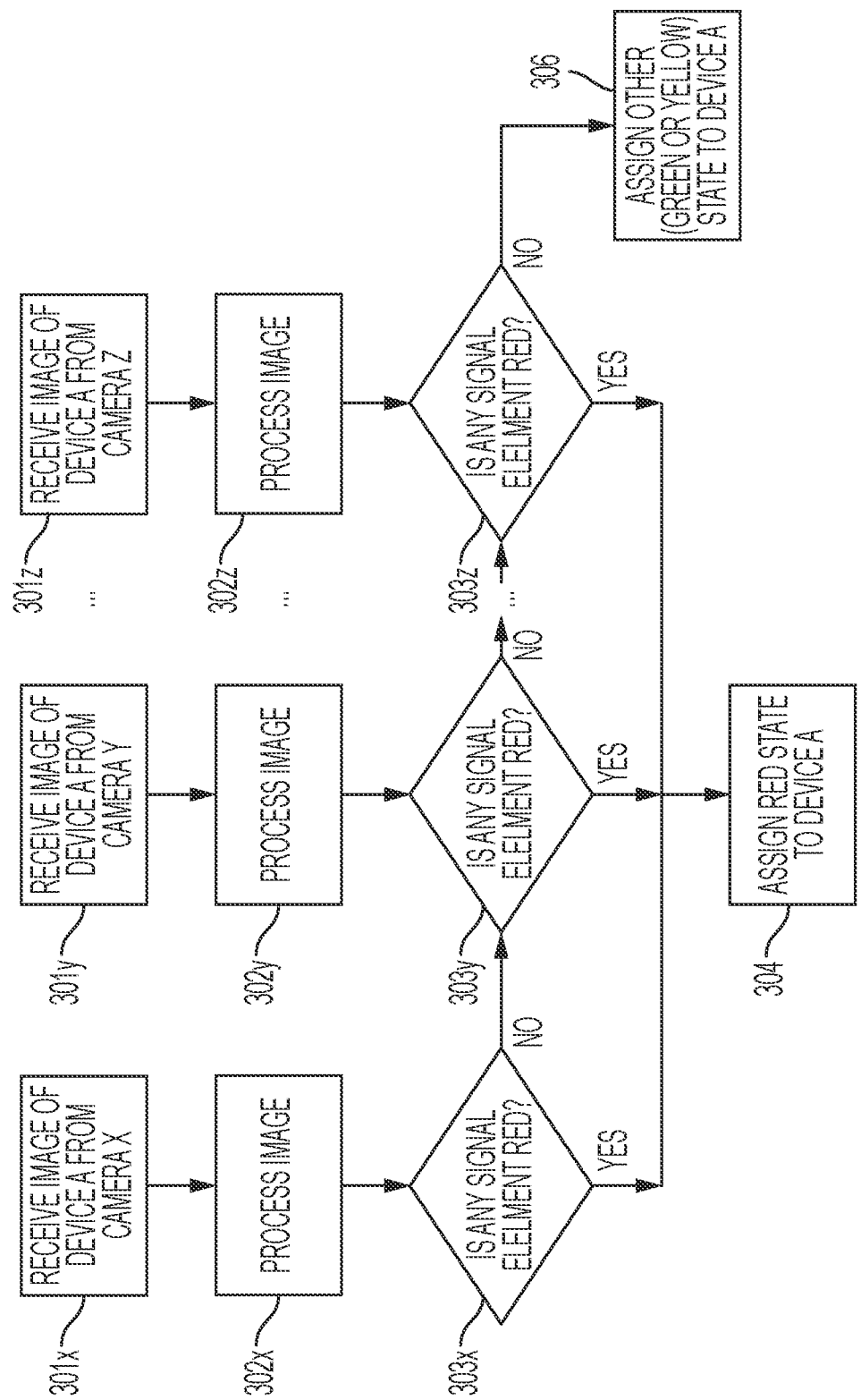
FIGS. 3A and 3B illustrate flowcharts of a method for calculating an overall state of one or more traffic signal devices, in accordance with various embodiments of the present disclosure.

In the process, the system first assigns a state to each individual traffic signal device that the system's cameras detect. The state may be a color state, a flashing state, or another state. An example process by which the system may do this is shown in FIG. 3A. At 301$x$ one of the system's cameras (denoted as "Camera X") will capture, and the system will receive, an image that includes a traffic signal device (denoted as "Device A"). At 302$x$ the system will process the image to assign one or more labels to each signal element of Device A, in which each label corresponds to a state at least one of the device's traffic signal elements. For example, if the processing step 302$x$ detects that the device's red signal element is illuminated, the system will assign the red color state to that signal element. However, if the processing step 302$x$ detects that the device's green or yellow signal element is illuminated, the system will assign the green or yellow color state to the detected signal element. This analysis will concurrently occur for images captured by any number of additional cameras (such as Camera Y following steps 301$y$-303$y$, and Camera Z following steps 301$z$-303$z$). If any signal element is assigned a red label in any of the concurrently captured images of Device A (303: YES for all cameras), then at 304 the system may assign the red state to Device A. If no signal element is labeled as red in any of the concurrently-captured images of Device A (303: NO for all cameras), then at 306 the system may assign a non-red state (such as green state or a yellow state, depending on which state is detected more frequently in the images) to Device A. Thus, the system may conservatively consider the color state of a particular traffic signal device to be red if any of the cameras captured an image that the system labeled as a red state. Optionally, the system also may assign other state labels, such as labels indicating whether or not the light is in a flashing (vs. continuous or non-flashing) state, or a state corresponding to a particular symbol (such as an arrow or an X). If so, the system may use a similar hierarchical process to that shown in FIG. 3A for any of the additional state labels, in which the state which signals a car to slow, stop, or otherwise proceed with caution (such as a flashing state) will take the place of the red state in steps 303$x$-303$z$.

Figure 3B:
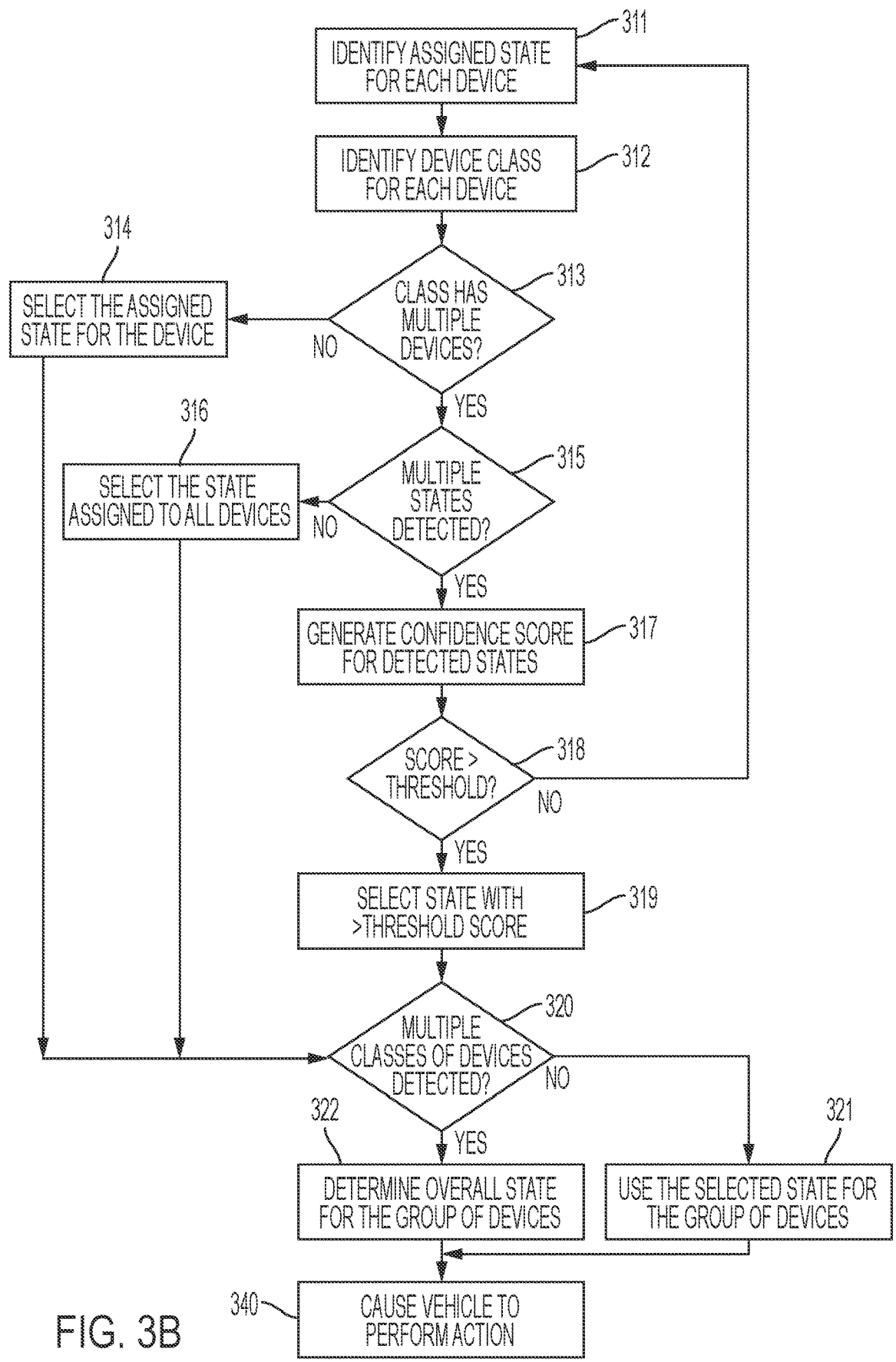

When the concurrently-captured images include multiple traffic signal devices (such as Device A and Device B), the system will perform the process of FIG. 3A for each of the traffic signal devices in the images to determine the overall state of a group of traffic signal devices at an intersection or other location. Referring to FIG. 3B, at 311 the system will identify a state for each device in the group of devices using a process such as that described in FIG. 3A. At 313 the system may identify a device class for each of the devices. The device class identification may be done in the traffic light identification process described above. The class will be a label that the system can use to segregate devices of different types (e.g., turning lane light vs. forward travel lane light), to group devices of having the same types (e.g., at locations with multiple left turn lanes or multiple forward travel lanes), or to rank or assign priorities to certain devices in a group of devices (e.g., a primary device positioned over an intersection and a secondary device positioned on a post next to the intersection).

For each class, when a class only has one device (313: NO), at 314 the system will simply continue to use the already-assigned state for that device. However, when multiple devices of a common class are detected (313: YES), then at 315 the system will assess whether the devices have been assigned states that are in conflict (i.e., inconsistent with each other, such as one red light and one green light). When the assigned states of each device are consistent with each other (i.e., not in conflict) (315: NO), then at 316 the system will use the commonly assigned state as the assigned state for that class of devices. Further, if only one class of device is detected (320: NO), then at 321 the system will use the assigned state for the class to be the collective state for the entire group of detected traffic signal devices, since no other device class analysis will be required.

However, when the assigned states of each device do not all match (315: YES), the system must resolve the conflict created by the initial detection of multiple traffic signal devices that share a common class but that have different states. To resolve this, at 317 the system will generate a confidence score for one or more of the detected states. The algorithm used for to generate the confidence score may simply be a calculation of the number of traffic signal devices in the group that share a particular state. The number may be an integer, percentage, ratio, or other type of number. For example, consider a location having three forward travel lanes and a traffic signal device assigned to each of the lanes. The devices are therefore all forward travel signals and are of a single class. If two of the devices are in a red state and one of the devices are in a green state, then the confidence score associated with the red state may be 0.667 and the confidence score associated with the green state may be 0.333.

At 318 the system may determine whether the confidence score for any of the detected states exceeds a confidence threshold. Confidence thresholds may be predetermined and stored in memory. Different device classes, and different states within each class, may be assigned different confidence thresholds. For example and only for purposes of discussion, if the confidence threshold of a red state for the forward travel class of devices is 0.35, then when two or more forward travel devices are in a green (or yellow) or state and only one is in a red state, the confidence score for the red state will not exceed the threshold. As another example, if the confidence threshold of a green state for the forward travel class of devices is 0.7, then to be assigned the green state the group of devices must have a confidence score of at least 0.7. In other words, at least 70% of the detected devices in that class must be green before the system will assign the green state to the group in this example.

In alternate embodiments, the confidence score also may be a number that corresponds to the number of detected devices having a particular state, and the confidence threshold may be a threshold above which the system will assign that state to the group of devices. For example, the confidence threshold for a red state may be one. If so, then when the system detects that two or more traffic signal devices in a group are in a red state, then the traffic signals will be assigned an overall red state. In some embodiments, when the system detects that two or more traffic signal devices in a group are in a red state and that at least a same number of traffic signal devices in the group are in a non-red (green or yellow) state, then the system may assign to the group of traffic signals either the green or yellow state, whichever non-red state applies to the majority of detected traffic signal devices. If the system detects only one traffic signal face in a red state and two or more traffic signal faces in a non-red state, then the system may assign to the group of traffic signals either the green or yellow state, whichever non-red state applies to the majority of detected traffic signal devices.

When the system generates an applicable confidence score that exceeds a threshold for a given state (318: YES), then the system will assign that state to the group of devices. However, if no confidence score exceeds the threshold, then the system may repeat the process described above for an additional group of images, optionally considering the additional group on its own or in combination with the already-analyzed set of images.

Once the system has selected a state with a confidence score that exceeds the threshold at 319, and when only one class of device has detected (320: NO), then at 321 the system will also assign the selected state to be the collective state for the entire group of detected traffic signal devices. However, if multiple classes of traffic signal devices have been detected (320: YES), then at 322 the system will assign an overall state for the group of devices. The system may use any suitable rule set to determine the state to assign in step 322, and the rules may vary based on the class types detected. For example, the rules may instruct the system to prioritize one class of devices over another by selecting one of the classes as a priority class, such as by prioritizing devices hanging above a lane over devices positioned on a post beside the lane. The system may choose the state assigned to the priority class. In addition or alternative, the rules may instruct the system to determine that the overall state is a multi-class state in which different categories of lanes (e.g., left turn lanes) may be assigned states that differ from the state assigned to other categories of lanes (e.g., forward travel lanes).

Thus, in the hierarchical approach described above, the system may combine images received from different cameras, and it may use the detected states of multiple traffic signal devices in each image, to determine the overall state of a set of traffic signals at an intersection or other location.

Once an overall state of the group of traffic signals is determined, the system will generate a signal, at 340, which will cause the vehicle to perform an action. The action may be, for example, a motion control action such as stopping, slowing down, turning, yielding, and/or other suitable actions. For example, if the vehicle is traveling in a lane in which the corresponding class of signal has been assigned red, the signal may be an instruction that causes the vehicle's motion control system to stop the vehicle before the intersection using processes such as those described below in FIG. 5. In addition or alternatively, the signal may include a programming an instruction to cause an audio speaker and/or display of the vehicle to output an audible and/or visual alert informing the vehicle operator that a red signal is ahead, or another action.

Figure 4:
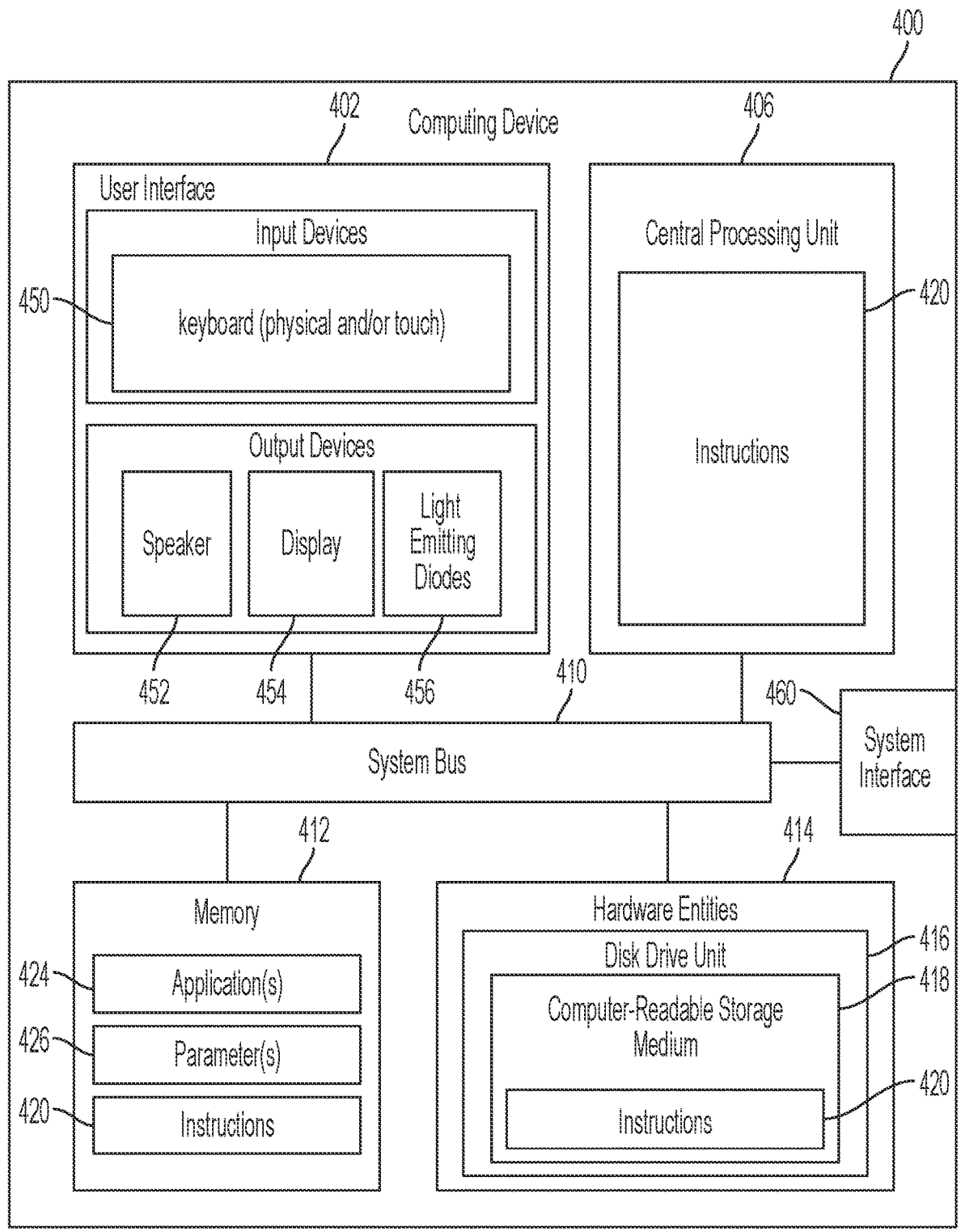
FIG. 4 is an illustration various elements of an illustrative computing device, in accordance with the present disclosure.

Referring now to FIG. 4, an illustration of an example architecture for a computing device 400 is provided. The computing device 140 of FIG. 1 is the same as or similar to computing device 400. As such, the discussion of computing device 400 is sufficient for understanding the computing device 140 of FIG. 1.

Computing device 400 may include more or less components than those shown in FIG. 1. However, the components shown are sufficient to disclose an illustrative solution implementing the present solution. The hardware architecture of FIG. 4 represents one implementation of a representative computing device configured to one or more methods and means for determining a state of one or more traffic signals, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a random access memory ("RAM"), a disk drive, flash memory, a compact disc read only memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 2:
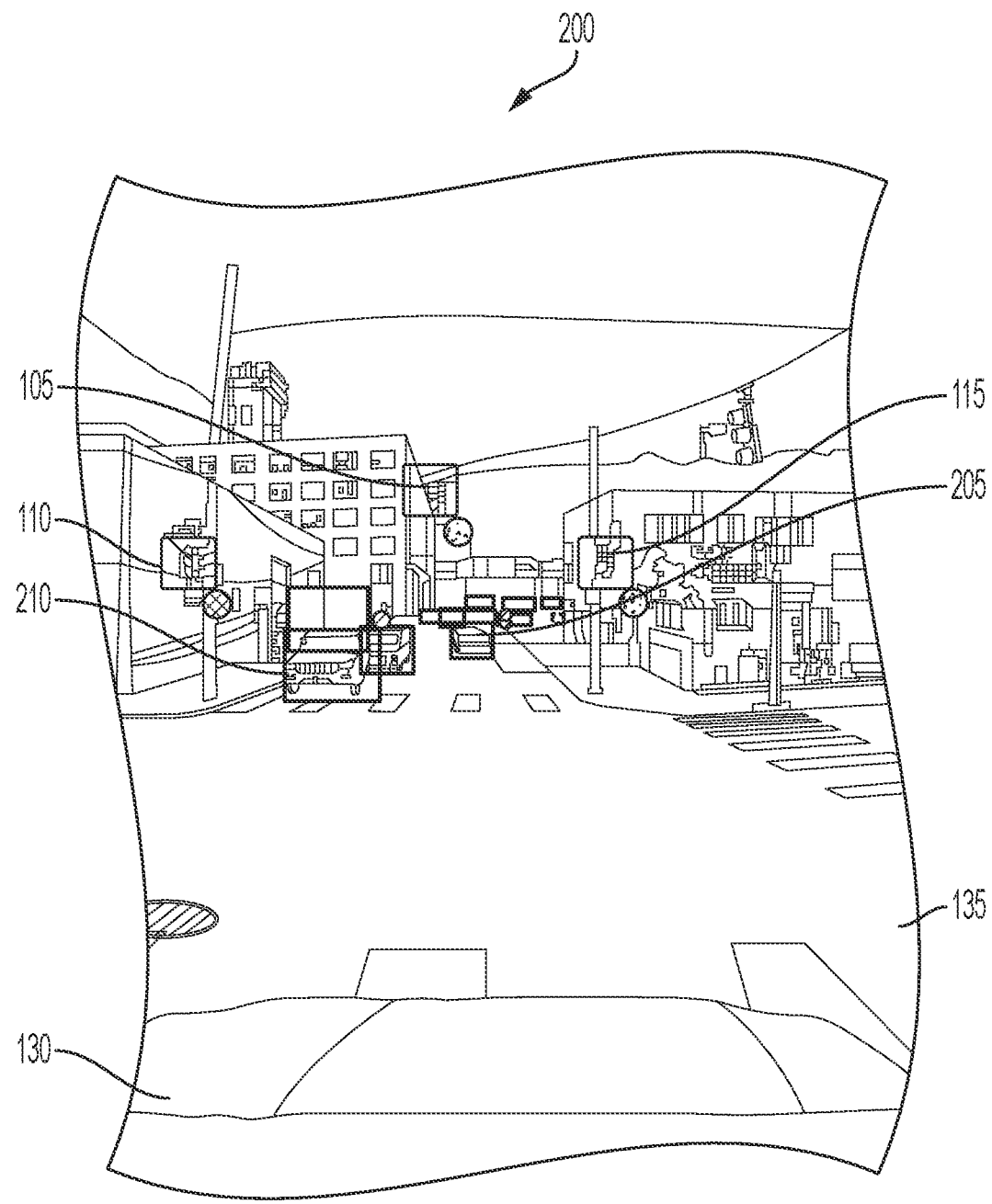
FIG. 2 is an example of an image of a plurality of traffic signal devices in an environment, in accordance with various embodiments of the present disclosure.
Figure 5:
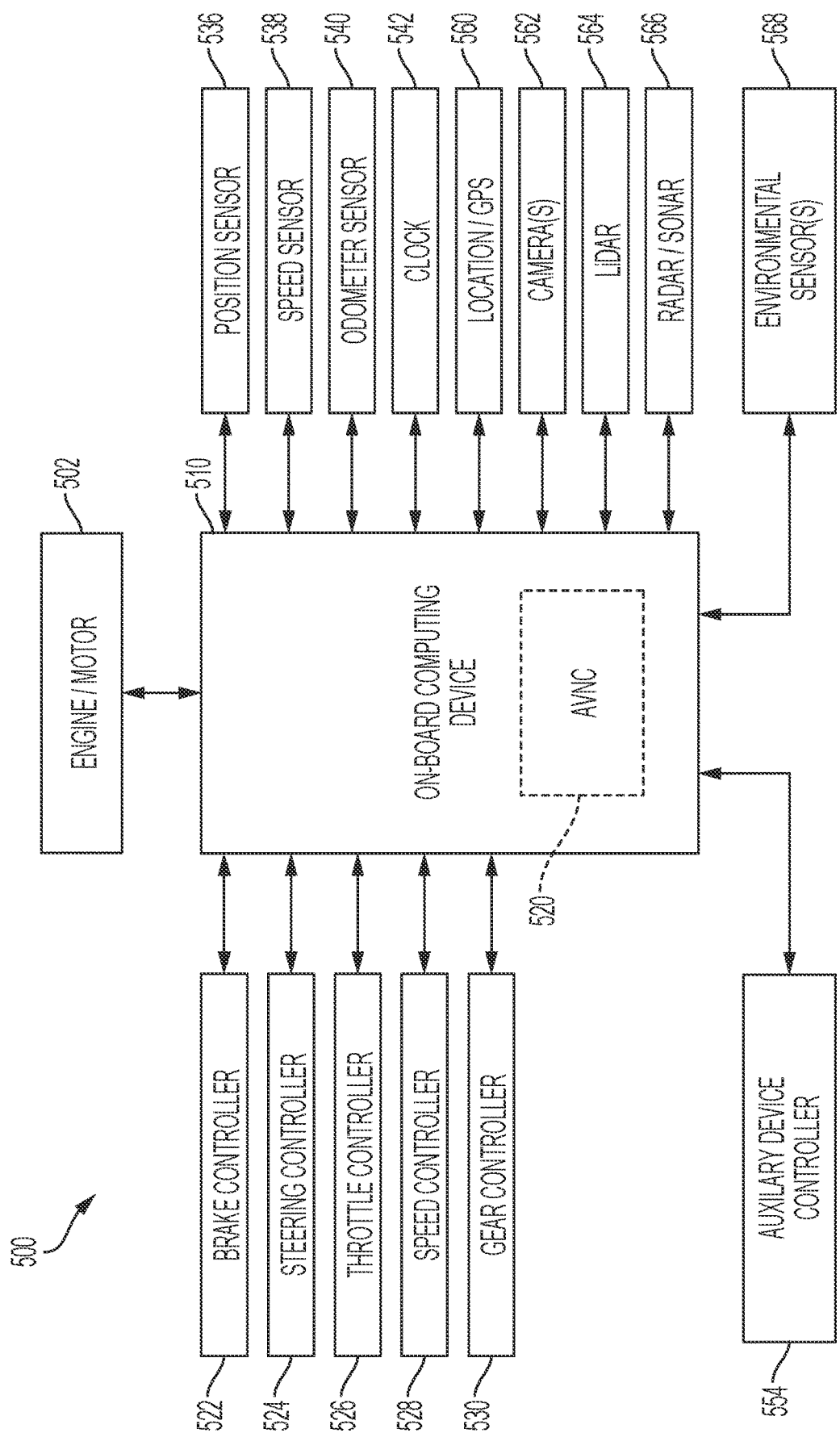
FIG. 5 illustrates example elements of an autonomous vehicle, in accordance with various embodiments of the present disclosure.

FIG. 5 illustrates an example system architecture 500 for a vehicle, such as an AV or other vehicle 130 as shown in FIGS. 1 and 2. The vehicle may include an engine or motor 502 and various sensors for measuring various parameters of the vehicle and/or its environment. Operational parameter sensors that are common to multiple types of vehicles include, for example: a position sensor 536 such as an accelerometer, gyroscope and/or inertial measurement unit; a speed sensor 538; and an odometer sensor 540. The system architecture 500 also may have a clock 542 that the system architecture 500 uses to determine vehicle time during operation. The clock 542 may be encoded into the vehicle on-board computing device 510, it may be a separate device, or multiple clocks may be available.

The system architecture 500 also may include various sensors that, together with a processor and programming instructions, serve as the object detection system that operates to gather information about the environment in which the vehicle is traveling. These sensors may include, for example: a location sensor 560 such as a GPS device; object detection sensors such as one or more cameras 562 (for example, cameras 145 in FIG. 1); a LiDAR sensor system 564; and/or a radar and or and/or a sonar system 566. The sensors also may include environmental sensors 568 such as a precipitation sensor and/or ambient temperature sensor. The object detection sensors may enable the system architecture 500 to detect objects that are within a given distance or range of the vehicle 130 in any direction, while the environmental sensors collect data about environmental conditions within the vehicle's area of travel. The system architecture 500 will also include one or more cameras 562 for capturing images of the environment. Any or all of these sensors will capture sensor data that will enable one or more processors of the vehicle's on-board computing device 510 (for example, computing device 155 and/or 400) and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 510. The on-board computing device may be integrated within the vehicle, it may be a portable electronic device carried within the vehicle, or it may be a combination of the two. The on-board computing device 510 analyzes the data captured by the sensors and optionally controls operations of the vehicle based on results of the analysis. For example, the on-board computing device 510 may control braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers such as an auxiliary device controller 554. The on-board computing device 510 may include an autonomous vehicle navigation controller 520 configured to control the navigation of the vehicle through its environment.

Geographic location information may be communicated from the location sensor 560 to the on-board computing device 510, which may then access a map of the environment that corresponds to the location information to determine known fixed features of the environment such as streets, buildings, stop signs and/or stop/go signals. Captured images from the cameras 562 and/or object detection information captured from sensors such as a LiDAR system 564 is communicated from those sensors) to the on-board computing device 510. The object detection information and/or captured images may be processed by the on-board computing device 510 to detect objects in proximity to the vehicle. In addition, or alternatively, the vehicle may transmit any of the data to a remote server system for processing. Any known or to be known technique for making an object detection based on sensor data and/or captured images can be used in the embodiments disclosed in this document.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of determining an overall state of a group of traffic signal devices, the method comprising, by a processor of a vehicle:
   accessing one or more images, taken concurrently, that each depict at least a subset of a group of traffic signal devices, the images corresponding to a plurality of classes used to segregate devices of different types;
   identify a plurality of states including a red state and non-red state within each of the classes in the one or more images:
   generating a confidence score for each of the states within each of the classes, and
   selecting, from the plurality of states, a state having a confidence score that exceeds a threshold, wherein the red state is associated with a first threshold, and the non-red state is associated with a second threshold higher than the first threshold;
   using the selected state to assign an overall state to the group of traffic signal devices; and
   using the overall state to generate a signal that will cause the vehicle to perform an action.

2. The method of claim 1, wherein the action comprises:
   implementing a motion control action;
   causing an audio speaker in the vehicle to output an audible alert that indicates the overall state; or
   causing a display device in the vehicle to output a visual alert that indicates the overall state.

3. The method of claim 1, wherein accessing the one or more images that each depict the group of traffic signal devices comprises:
   receiving a plurality of images that were concurrently captured by a plurality of cameras;
   assigning, to at least one traffic signal element on each of the traffic signal devices each of plurality of images, a label indicating a color state of the traffic signal element; and
   for each of the traffic signal devices:
   if any of the labels for any of the traffic signal elements indicates the red state, assigning the red state to the traffic signal device, otherwise assigning the non-red color state to the traffic signal device.

4. The method of claim 1, wherein accessing the one or more images that each depict the group of traffic signal devices comprises:
   wherein the one or more images were concurrently captured by a plurality of cameras;
   assigning, to at least one traffic signal element on each of the traffic signal devices in each of plurality of images, a label indicating a flashing state or a non-flashing state; and
   for each of the traffic signal devices:
   if any of the labels for any of the traffic signal elements indicates a flashing state, assigning the flashing state to the traffic signal device,
   otherwise assigning a non-flashing state to the traffic signal device.

5. The method of claim 3 further comprising, by the plurality of cameras, concurrently capturing the images.

6. The method of claim 1, wherein generating the confidence score for each of the states comprises, for each of the states, calculating a number of the traffic signal devices in the group that share that state.

7. The method of claim 1, further comprising, for each of the traffic signal devices identifying the threshold by selecting, from a memory, a confidence threshold that is associated with the class of the traffic signal device.

8. The method of claim 1, wherein using the selected state to assign an overall state to the group of traffic signal devices comprises:
   in response to the traffic signal devices in the group corresponding to multiple classes of devices:
   identifying one of the multiple classes to be a priority class, and
   determining the overall state for the group of devices to be the selected state of the priority class,
   wherein the priority class is defined by a location of the traffic signal devices relative to a driving lane.

9. The method of claim 1, wherein using the selected state to assign an overall state to the group of traffic signal devices comprises:
   in response to the traffic signal devices in the group corresponding to multiple classes of devices assigning a multi-class state in which each of the classes is assigned a unique state.

10. The method of claim 1, further comprising:
    anticipating a presence of the group of traffic signal devices using a vehicle location; and
    analyzing the one or more images to identify the group of traffic signal devices responsive to arriving at the vehicle location.

11. A system comprising:
    a processor; and
    a memory containing programming instructions that are configured to cause the processor to determine an overall state of a group of traffic signal devices by:

receiving a plurality of images that were captured by a plurality of sensors coupled to a vehicle, wherein the images each depict a group of traffic signal devices, in response to the traffic signal devices of the group exhibiting a plurality of states in the one or more images, the plurality of states including a red state and non-red state:

generating a confidence score for each of the states; and selecting, from the plurality of states, a state having a confidence score that exceeds a threshold, wherein the red state is associated with a first threshold, and the non-red state is associated with a second threshold higher than the first threshold, using the selected state to assign an overall state to the group of traffic signal devices, and using the overall state to generate a signal that will cause the vehicle to perform an action.

12. The system of claim 11, wherein the instructions to perform the action comprise instructions to:
cause the vehicle to implement a motion control action;
cause an audio speaker in the vehicle to output an audible alert that indicates the overall state; or
cause a display device in the vehicle to output a visual alert that indicates the overall state.

13. The system of claim 11, further comprising additional programming instructions to process the plurality of images by:
assigning, to at least one traffic signal element on each of the traffic signal devices in each of plurality of images, a label indicating a color state of the traffic signal element; and
for each of the traffic signal devices:
if any of the labels for any of the traffic signal elements indicates a red state, assigning the red state to the traffic signal device,
otherwise assigning a non-red color state to the traffic signal device.

14. The system of claim 11, further comprising additional programming instructions to process the plurality of images by:
assigning, to at least one traffic signal element on each of the traffic signal devices in each of plurality of images, a label indicating a flashing state or a non-flashing state; and
for each of the traffic signal devices:
if any of the labels for any of the traffic signal elements indicates the flashing state, assigning the flashing state to the traffic signal device,
otherwise assigning the non-flashing state to the traffic signal device.

15. The system of claim 11, wherein:
the instructions to generate the confidence score for each of the states comprise instructions to, for each of the states, calculate a number of the traffic signal devices in the group that share that state; and
the system further comprises instructions to, for each class of traffic signal device, identify the threshold by selecting, from a memory, a confidence threshold that is associated with the class of the traffic signal device.

16. The system of claim 11, wherein the instructions to use the selected state to assign an overall state to the group of traffic signal devices comprise instructions to:

if the traffic signal devices in the group correspond to a single class of devices rather than multiple classes of devices, assigning the selected state to be the overall state; otherwise:
identify one of the multiple classes of devices to be a priority class, and determining the overall state for the group of devices to be the selected state of the priority class; or
assign a multi-class state in which each of the classes is assigned a unique state.

17. A computer program product comprising a memory storing programming instructions that are configured to cause a processor to determine an overall state of a group of traffic signal devices by:
receiving a plurality of images that were captured by a plurality of sensors coupled to a vehicle, wherein the images each depict a group of traffic signal devices,
in response to the traffic signal devices of the group exhibiting a plurality of states including a red state and non-red state in the one or more images:
generating a confidence score for each of the states; and
selecting, from the plurality of states, a state having a confidence score that exceeds one or more threshold threshold, wherein the red state is associated with a first threshold, and the non-red state is associated with a second threshold higher than the first threshold,
using the selected state to assign an overall state to the group of traffic signal devices, and using the overall state to generate a signal that will cause the vehicle to perform an action.

18. The computer program product of claim 17, wherein the instructions to perform the action comprise instructions to:
cause the vehicle to implement a motion control action;
cause an audio speaker in the vehicle to output an audible alert that indicates the overall state; or
cause a display device in the vehicle to output a visual alert that indicates the overall state.

19. The computer program product of claim 17, further comprising additional programming instructions to process the plurality of images by:
assigning, to at least one traffic signal element on each of the traffic signal devices in each of plurality of images, a label indicating a color state of the traffic signal element; and
for each of the traffic signal devices, if any of the labels for any of the traffic signal elements indicates a red state, assigning the red state to the traffic signal device, otherwise assigning the non-red color state to the traffic signal device.

20. The computer program product of claim 19, wherein the instructions to use the selected state to assign an overall state to the group of traffic signal devices comprise instructions to:
if the traffic signal devices in the group correspond to a single class of devices rather than multiple classes of devices, assign the selected state to be the overall state; otherwise:
identify one of the multiple classes of devices to be a priority class, and determining the overall state for the group of devices to be the selected state of the priority class, or
assign a multi-class state in which each of the classes is assigned a unique state.

\* \* \* \* \*